Figure 1:
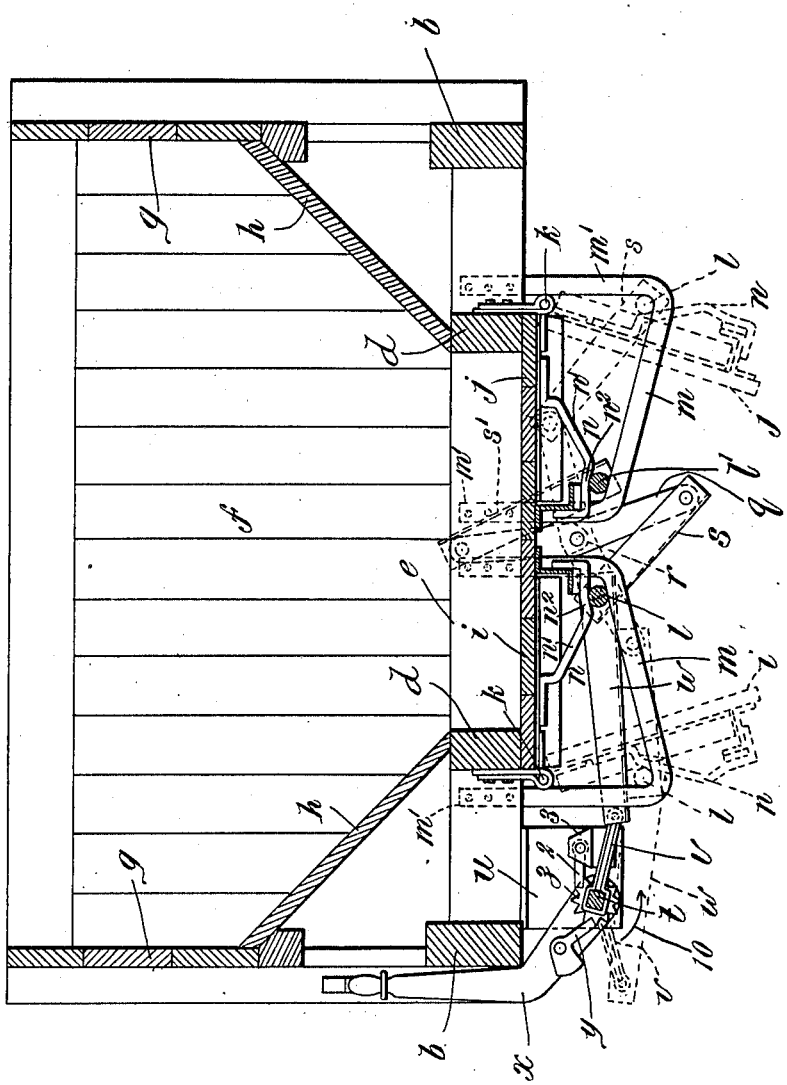

R. M. ZIMMERMAN.
DUMP CAR.
APPLICATION FILED JULY 30, 1910.

1,021,083.

Patented Mar. 26, 1912.

3 SHEETS—SHEET 1.

Witnesses

Robert M. Zimmerman
Inventor
By Attorney

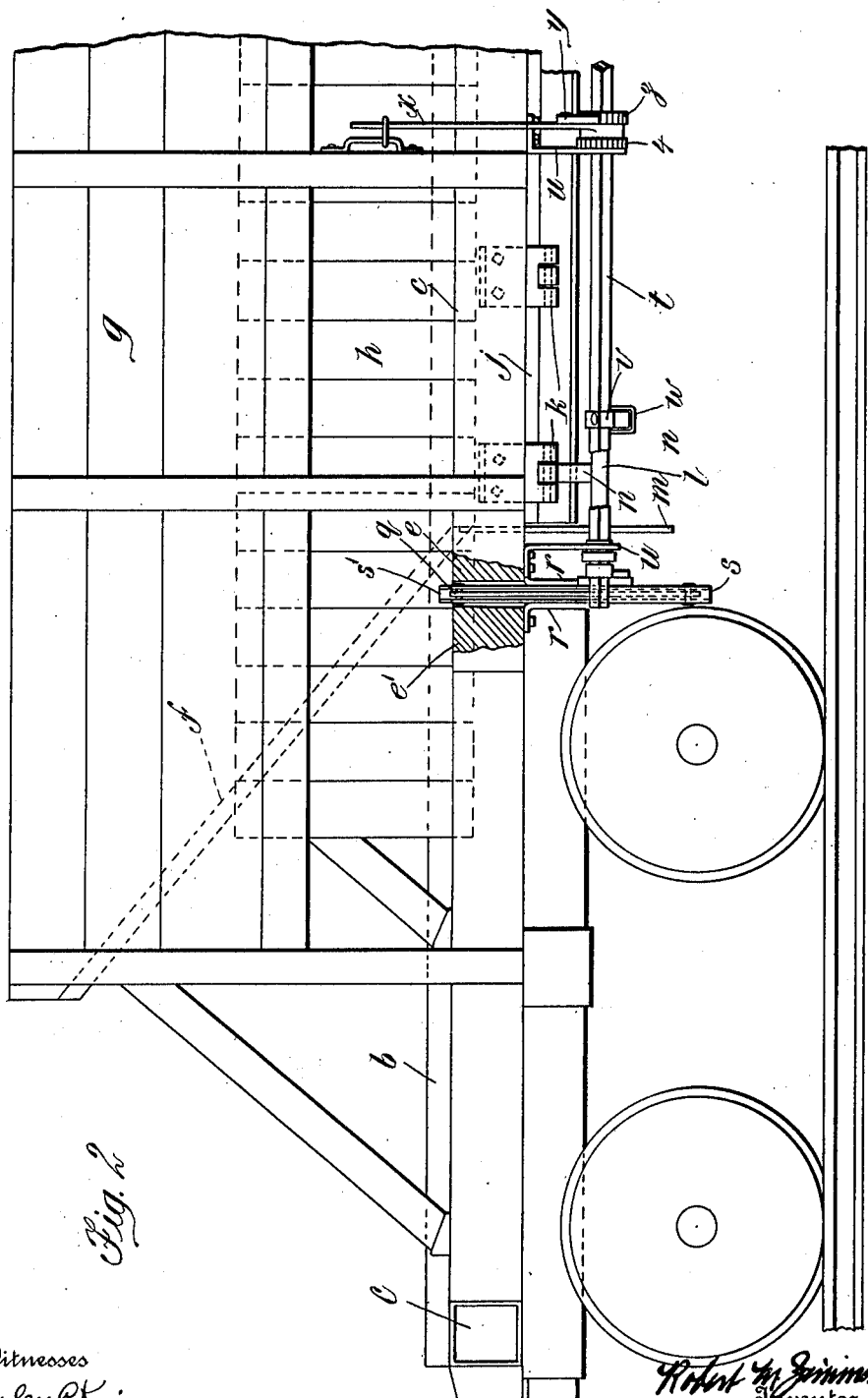

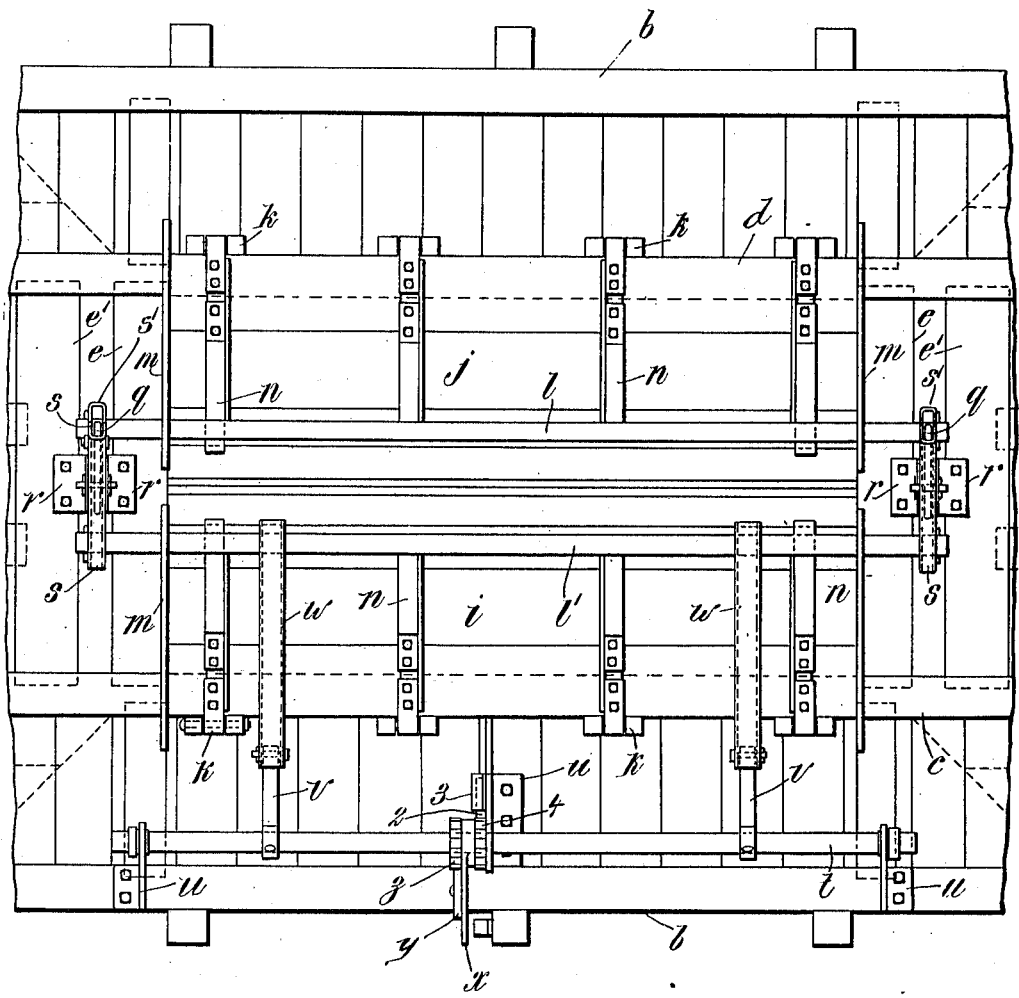

UNITED STATES PATENT OFFICE.

ROBERT MONTAGUE ZIMMERMAN, OF MONTREAL, QUEBEC, CANADA, ASSIGNOR TO NATIONAL DUMP CAR COMPANY, OF CHICAGO, ILLINOIS, A CORPORATION OF MAINE.

DUMP-CAR.

1,021,083.     Specification of Letters Patent.     Patented Mar. 26, 1912.

Application filed July 30, 1910. Serial No. 574,681.

*To all whom it may concern:*

Be it known that I, ROBERT MONTAGUE ZIMMERMAN, of the city of Montreal, Province of Quebec, Canada, have invented certain new and useful Improvements in Dump-Cars; and I do hereby declare that the following is a full, clear, and exact description of the same.

My invention relates particularly to the means for operating the discharge doors of dump cars, and consists of the construction and combination of parts hereinafter described and pointed out in the claims. For full comprehension, however, of my invention reference must be had to the accompanying drawings forming a part of this specification, in which similar reference characters indicate the same parts and wherein—

Figure 1 is a transverse vertical sectional view of a car constructed according to my invention, Fig. 2 is a side elevation of one end thereof partly broken away; and Fig. 3 is a plan view of the underside of the car with the ends of the latter broken away.

The body of the car illustrated comprises a floor frame consisting of a pair of side sills $b$ end sills $c$ longitudinal intermediate sills $d$, and auxiliary sills $e$ and $e'$ situated transversely between the sills $d$. The superstructure carried by this floor frame comprises inclined end hopper walls $f$ and side walls consisting of vertical and inclined portions $g$ and $h$ respectively, the longitudinal intermediate sills $d$ and auxilary sills $e$ having the hopper walls fastened thereto and forming the frame of the discharge opening of the car, the doors $i$ and $j$ being hinged as at $k$ to the sills $d$, forming the sides of the discharge opening.

The door mechanism comprises longitudinal shafts $l$ and $l'$ located beneath the doors and which are adapted to travel up and down inclined supporting rails $m$ to cause the doors to close or open, such rails being arranged below the level of the car body and inclined upwardly toward the center of the car, being secured to the car frame by bolts or rivets passing through upwardly extending arms $m'$ formed integrally with the rails. Secured to the underside of the doors are rails $n$ which bear upon the shafts $l$. These rails have their main portions $n'$ inclined downwardly toward the center of the car (considering the doors to be in closed position as shown in full lines Fig. 1) and converging toward the rails $m$, while portions $n^2$ of each rail $n$, adjacent to the inner edge of the doors under which the shafts ride when the doors are approaching their closed position, are bent at an angle to the main portion and inclined slightly upon and toward the inner edge of the doors to present a diminished angle of convergence toward the rails $m$ so that the shafts have the effect of very acute angled wedges inserted between the two rails to hold the doors firmly closed.

A pair of levers $q$ are fulcrumed at their centers to a pair of brackets $r$ suspended from the car frame a short distance beyond each end of the door frame in order to be located out of the path of the doors, the said fulcrum points being below the level of the abutting edges of the doors when the latter are closed. The opposite ends of these levers are operatively connected to the shafts $l$ by links $s$ and $s'$ of channel cross-section.

The shafts are reciprocated laterally on the rails $m$ by an oscillatory shaft $t$ supported on bearing brackets $u$ secured to one side of the bottom of the car, and having rigidly mounted thereon a pair of crank arms $v$ connected to the opposite ends of the shafts $p$ by pitmen $w$ also of channel cross-section.

The oscillatory shaft $t$ is operated by a lever $x$ fulcrumed to the middle portion thereof and carrying a weighted operating pawl $y$ engaging a ratchet wheel $z$ rigidly mounted upon such shaft, while a detent pawl 2, carried by a bracket 3 secured to one of the bearing brackets $u$, engages a second ratchet wheel 4 (Figs. 2 and 3) rigidly mounted upon the said shaft.

Operation: To close the doors the lever $x$ is operated to turn the shaft $t$ in the direction of arrow 10 which, by means of the lever arms and pitmen, pushes the shaft $l$ sidewise up its inclined supporting rail and thereby causes the link $s$ to lower one end of lever $q$ and the opposite end of such lever to draw link $s'$ upwardly and move the shaft $l'$ to the upper end of its inclined supporting rail thus closing the doors the shafts becoming wedged between the converging surfaces of the portions $n^2$ of the rails on the doors and the rails $m$. To open the doors the shaft is turned in the opposite direction by the lever $x$ thus releasing the shafts $l$ $l'$ from their position wedged between the rails and permitting the doors to be precipitated to their full open position.

What is claimed is as follows:—

1. In a dump car, the combination with a pair of doors, of door operating mechanism comprising a lever, a pair of laterally movable shafts upon which the doors rest freely, links operatively connecting the shafts to the lever, means through which the shafts act upon the doors, and reciprocatory means operatively connected to one of the said shafts.

2. In a dump car, the combination with a pair of doors, of door operating mechanism comprising a lever fulcrumed between its ends, a pair of laterally movable door supporting members upon which the doors rest freely, links operatively connecting the opposite ends of the lever to the members, means through which the members act upon the doors and reciprocatory means operatively connected to one of the said members.

3. In a dump car, the combination with a pair of doors, of door operating mechanism comprising a lever fulcrumed below the level of the abutting edges of the doors when the latter are closed and out of the path of such doors; a pair of laterally movable shafts supporting the doors; links operatively connecting the opposite ends of the lever to the shafts, and means whereby the said mechanism is operated.

4. In a dump car, the combination with a pair of doors, of door operating mechanism comprising a lever fulcrumed below the level of the abutting edges of the doors when the latter are closed and out of the path of such doors, a pair of laterally movable shafts supporting the doors, links operatively connecting the opposite ends of the lever to the shafts, reciprocatory operating mechanism, and a pitman connecting the reciprocatory mechanism to one of the shafts.

5. In a dump car, the combination with a pair of doors, of door operating mechanism comprising a lever fulcrumed below the level of the abutting edges of the doors when the latter are closed and out of the path of such doors; a pair of laterally movable shafts supporting the doors; links operatively connecting the opposite ends of the lever to the shafts, an oscillatory shaft; a crank arm rigidly mounted on the last mentioned shaft, and a pitman operatively connecting the crank arm to one of the said laterally movable shafts.

6. In a dump car, the combination with a pair of doors, of door operating mechanism comprising a lever fulcrumed between its ends the fulcrum being located in the longitudinal center line of the car and below the level of and out of the path of the said doors, downwardly inclined rails fixed to the undersides of the doors, upwardly inclined rails fixed to the frame of the car, a pair of laterally movable door operating shafts having the first mentioned rails resting thereon and such shafts being supported by the last mentioned rails, links operatively connecting the opposite ends of the lever to the shafts, an oscillatory shaft, a pair of crank arms rigidly mounted on such shaft, pitmen attached at one end to one of the laterally movable shafts and pivotally connected at their opposite ends to the crank arms, and means for operating the oscillatory shaft.

7. In a dump car, the combination with a pair of doors, of door operating mechanism comprising a lever fulcrumed below the level of the abutting edges of the doors when the latter are closed and out of the path of such doors; a pair of laterally movable shafts supporting the doors; links operatively connecting the opposite ends of the lever to the shafts, and reciprocatory means operatively connected to one of the shafts.

8. In a dump car, the combination with a pair of doors presenting rails on the underside thereof, of door operating mechanism comprising a lever fulcrumed between its ends the fulcrum being located in the longitudinal center line of the car and below the level of and out of the path of the said doors, rails fixed to the frame of the car; a pair of laterally movable door operating shafts having the first mentioned rails resting thereon and such shafts being supported by the last mentioned rails; links operatively connecting the opposite ends of the lever to the shafts; an oscillatory shaft; a pair of crank arms rigidly mounted on such shaft; pitmen attached at one end to one of the laterally movable shafts and pivotally connected at their opposite ends to the crank arms; and means for operating the oscillatory shaft.

9. In a dump car, the combination with a pair of doors, of mechanism for operating one of the doors including a laterally movable member supporting the said door, means independent of the operating mechanism for supporting the said laterally movable member, a lever fulcrumed between its ends, means operatively connecting one end of such lever to the said door operating mechanism and means operatively connecting the other end of the lever to the other door.

10. In a dump car, the combination with a pair of doors and a pair of laterally movable door supporting members upon which the doors freely rest of mechanism for operating one of the door supporting members, a lever fulcrumed between its ends, a link connecting the said operated door supporting member to one end of the lever, and a second link connecting the opposite end of the lever to the other door supporting member.

11. In a dump car, the combination with a pair of doors, of a pair of reciprocatory door operating shafts, supporting rails for such shafts, means for operating one of such shafts, and means whereby such shaft operates the other.

12. In a dump car, the combination with a pair of doors, of door operating means comprising a pair of laterally movable members located beneath the doors and upon which the doors freely rest, means through which such members act upon the doors, means for operating one of the said laterally movable members, and means operatively connecting the said members together.

In testimony whereof, I have signed my name to this specification, in the presence of two subscribing witnesses.

ROBERT MONTAGUE ZIMMERMAN.

Witnesses:
STANLEY C. KING,
JOHN A. O'KEEFE.

Copies of this patent may be obtained for five cents each, by addressing the "Commissioner of Patents, Washington, D. C."